Nov. 9, 1948.  H. V. WILLIAMSON ET AL  2,453,480
QUICKLY DETACHABLE COUPLING
Filed Nov. 2, 1945                      2 Sheets-Sheet 1
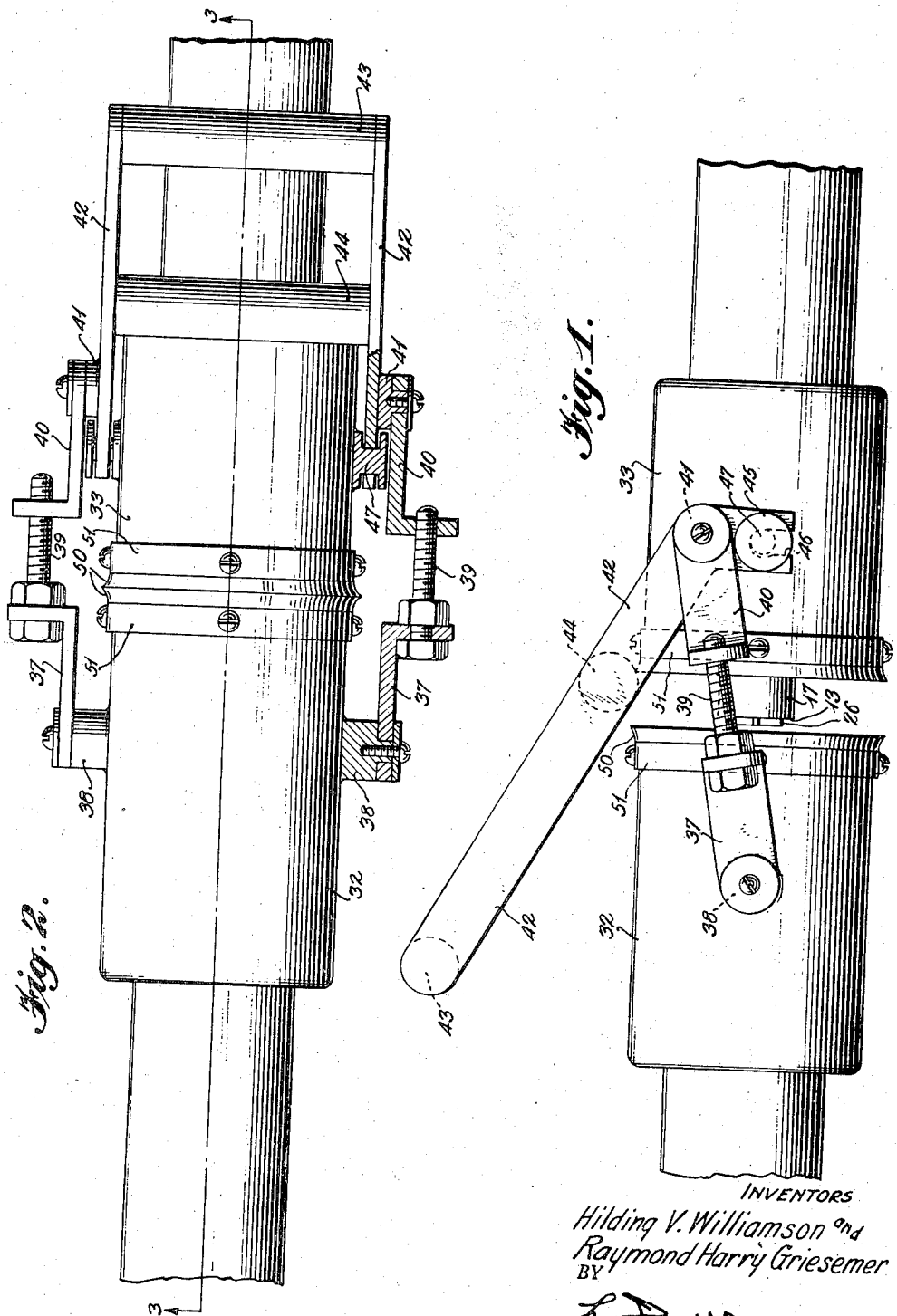
INVENTORS
Hilding V. Williamson and
Raymond Harry Griesemer
BY
L. Donald Myers
ATTORNEY Nov. 9, 1948.   H. V. WILLIAMSON ET AL   2,453,480
QUICKLY DETACHABLE COUPLING
Filed Nov. 2, 1945   2 Sheets-Sheet 2
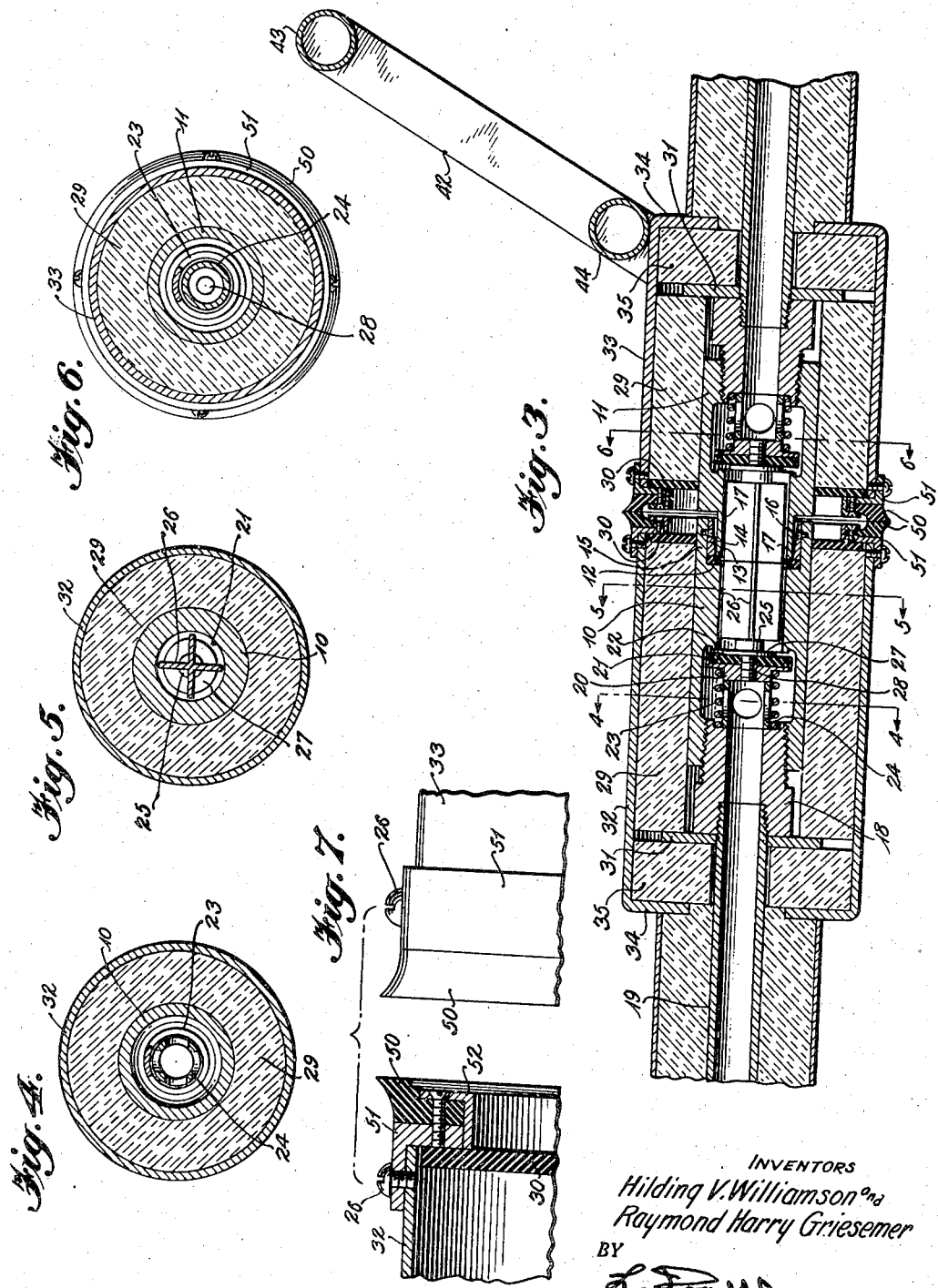
INVENTORS
Hilding V. Williamson and
Raymond Harry Griesemer
BY
L. Donald Myers
ATTORNEY Patented Nov. 9, 1948

2,453,480

UNITED STATES PATENT OFFICE 2,453,480

QUICKLY DETACHABLE COUPLING

Hilding V. Williamson and Raymond Harry Griesemer, Chicago, Ill., assignors to Cardox Corporation, Chicago, Ill., a corporation of Illinois Application November 2, 1945, Serial No. 626,308

11 Claims. (Cl. 285—171)

This invention relates to a quickly detachable coupling for conduits, and more particularly to an insulated coupling for joining together conduits which are intended to carry a cooled fluid medium.

The coupling with which the present invention is concerned has especial utility for joining conduits intended to carry liquid carbon dioxide. One possible use is to connect a conduit line from a vessel containing liquid carbon dioxide, to the conduit of another vessel which is to be charged with the liquid carbon dioxide. As the liquid carbon dioxide is under a pressure commensurate with its low temperature, it is important that escape from the conduits be prevented when the coupling is disconnected.

It is also desirable that the coupling be insulated and this is especially important to prevent condensation and freezing of atmospheric moisture upon the coupling. The atmosphere should be excluded, in particular, from the region of the seating surfaces of the coupling so that there will not be a layer of ice which will resist separation of the coupling.

The invention, therefore, involves a quickly detachable coupling which includes check valves which will automatically prevent the escape of liquid carbon dioxide from the parts of the coupling when they are separated from each other.

Another feature of the invention involves the provision of means for automatically opening the check valves when the parts of the coupling are brought together, so as to establish a through flow for the fluid.

Another feature of the invention involves the provision of insulation upon the coupling and the provision of a seal associated with this insulation to prevent access of atmospheric moisture to the coupling elements.

Other features of the invention will appear from the following discussion when considered with the accompanying drawings.

In the drawings:

Figure 1 is a side view of the coupling, the parts being separated, but the clamping linkage being in position to draw the parts together, Figure 2 is a side view, a quarter turn from Figure 1, the parts being drawn together, and one side of the clamping linkage being in section, Figure 3 is a sectional view on the line 3—3 of Figure 2, Figure 4 is a sectional view on the line 4—4 of Figure 3, Figure 5 is a sectional view on the line 5—5 of Figure 3, Figure 6 is a sectional view on the line 6—6 of Figure 3, and Figure 7 is an enlarged view of the seal between the meeting faces of the insulation.

The coupling involves two hollow members 10 and 11, each having seats at one end which are intended to cooperate with each other when the hollow members are brought together to establish a fluid-tight seal. The hollow member 10 is provided with a gasket 12 which presents a seating surface against which the end seating surface 13 of hollow member 11 contacts. The gasket 12 is held in place by a retaining sleeve 14 fitting within an annular forward projection 15 of the hollow member 10 and held in this position by screws 16. The sleeve 14 also serves as a guide to direct the seating surface 13 of the hollow member 11 into proper registration with the gasket 12. For this reason the seating surface 13 is at the end of a reduced portion 17 of hollow member 11 which will enter within the sleeve 14. Also, the inner surface of the retaining sleeve 14 is outwardly flared to better serve as a guideway.

Except for this difference in the formation of the meeting ends of the hollow members 10 and 11, they are of identical construction. Therefore, a description of the remainder of one of these hollow members will suffice for an explanation of the construction of the other. The hollow member 10 has threaded into the other end thereof from the seating gasket 12 a reducing union 18. Union 18 may be threaded, as shown, to receive the threaded end of a pipe or conduit 19, but it is apparent that any other means may be employed for joining the conduit 19 to the union 18.

Within the hollow member 10 is a check valve which prevents the escape of fluid past the seating gasket 12 when the hollow members 10 and 11 are separated. This check valve includes a valve head 20 having a recessed face to receive a gasket 21. The gasket 21 is intended to seat against an annular rib 22 formed about a shoulder in the interior of the hollow member 10, to constitute a valve seat. The valve head 20 is urged toward the valve seat 22 by means of a spring 23 which bears at one end upon a shoulder on the valve head 20 and at its other end upon the union 18. A sleeve 24 affixed to the union 18 serves as a guide for the spring 23. Openings through this sleeve 24 permit the flow of fluid.

To guide the valve head 20 in its back and forth movement, toward and away from the valve seat 22, it has affixed thereto an extension 25. This extension has fins 26, the outer edges of which bear against the inner wall of the hollow member 10 to serve as a guide. These fins 26 permit the passage of fluid through the hollow member when the valve head 20 is off of its seat.

In the arrangement here shown, the valve extension 25 also serves to retain the gasket 21 in its recess in the valve head 20. This is accomplished by forming the extension 25 with a flange 27 which bears upon the gasket 21. The valve extension 25 may be affixed to the valve head 20 by means of a threaded stem 28 which is screwed into the valve head 20.

When the hollow members 10 and 11 are separated, the springs 23 will force the gaskets 21 of the valve heads 20 upon the valve seats 22 so that fluid cannot flow through the hollow members. The valve extensions 25 are sufficiently long, however, so that when the two hollow members 10 and 11 are brought together in the assembled relationship, shown in Figure 3, their ends will contact with each other to such an extent that the valve heads 20 will be forced off of their respective valve seats 22. The extent to which either valve head can be forced away from its seat is limited by the sleeve 24 as the valve head will strike against the end of this sleeve. This is important to make certain that both valves are unseated when the hollow members are brought together. If such a limit were not imposed upon the unseating movement of both valves, it would be possible for one of the valves to stick closed and force the other valve to move away from its seat further than is necessary.

Each of the hollow members 10 and 11 is enclosed within a layer of insulating material. This includes a cylindrical layer 29 around the outside of each hollow member 10 and 11. As appears from Figure 3, this insulating material 29 should terminate somewhat short of the meeting ends of the hollow members 10 and 11 and a washer 30 should bear against these opposed ends of the material to retain it in place and protect the insulation 29 when the coupling is disconnected. At the other end of the insulation 29 is located a washer 31 which bears against this other end face of the insulating material 29 and also bears against the outer end face of the union 18.

Outside of the insulating material 29 of the hollow member 10 is a shell 32, and a similar shell 33 is outside of the insulating material of the hollow member 11. These shells or housings 32 and 33 are of similar construction except for their lengths and except for the provision of means to receive elements for holding the parts of the coupling together, which will be described later. The shells 32 and 33 each have an inwardly disposed flange 34, and insulating material 35 is disposed in the space between the washers 31 and the internal flanges 34.

It will be apparent that if the shells 32 and 33 are drawn toward each other, their internal flanges 34 will bear upon and compress the insulating materials 35 in such manner that the washers 31 will be pressed upon so as to cause them to move toward each other. This movement of washers 31 will carry with them the unions 18 and because of their attachment to the hollow members 10 and 11 the seating surfaces at 13 and 12 will be brought forcibly together. The interposition of the insulation 35 in this line of application of force will provide a resilient force transmitting medium which will serve to effectively compress together the seating surfaces at 12 and 13.

To forcibly draw the shells 32 and 33 together and thereby cause the seating surfaces at 12 and 13 of the hollow members 10 and 11 to seat, a latch consisting of a lever and linkage is provided. This includes links 37 which are pivoted upon bosses 38 on diametrically opposite sides of the shell 32. The other ends of the links 37 are turned outwardly and are bored to loosely receive adjusting screws 39. Threaded upon the adjusting screws 39 are links 40.

These links 40 are pivoted upon bosses 41 projecting from the sides of a pair of lever arms 42. The lever arms 42 are connected at their outer ends by a cross bar 43 and inwardly from their ends by a cross bar 44. Lever arms 42 also each have an angularly projecting portion 45 which is notched at 46 to receive pivot pins 47 affixed to diametrically opposite sides of shell 33.

Because of the notches 46 in the angularly projecting portions 45 of arms 42, the arms 42 may be removed from the pins 47 so that the shells 31 and 32 and their contained hollow members 10 and 11 may be completely separated from each other. When it is desired to hold the parts together, the notches 46 in the portions 45 of arms 42 may be merely brought upon the pins 47, and thereafter when the arms 42 are pivoted about the pins 47, the links 40 will be drawn upon to thereby draw the shell 32 toward the shell 33.

Movement of lever arms 42 to the right, from the position of Figure 1, will pull the coupling parts together and this should be continued until the axes of bosses 41 are carried past the line of centers of bosses 38 and pins 47. At this time the cross bar 44 will bear upon the outer surface of the shell 33 and stop further movement of arms 42, and shells 32 and 33 should then be tightly pulled together. When the parts are in the coupled position of Figures 2 and 3, the pins 47 will be retained at the bottoms of the notches 46 due to the direct pull exerted by the links 40. As the links 40 will have been carried across the centers of pins 47, there will be no tendency for the arms 42 to swing in the reversed position, such as would release the shells 32 and 33.

Since the shells 32 and 33 are thus forcibly drawn to each other and are locked in this position by the over-center-movement of links 40, the seating surfaces at 12 and 13 of the hollow members 10 and 11 will be forcibly urged together. As has been noted, this forcible pressure of members 10 and 11 toward each other is caused by the interposition of the yieldable insulating material at 35 in the line of transmission of the forces.

As an important feature of the invention, atmospheric moisture is precluded from reaching the seating surfaces at 12 and 13 and the adjacent region by the provision of sealing means which seat at the outer portion of the meeting faces of the insulation. This involves the provision of a resilient seating ring 50 supported at the peripheries of the shells 32 and 33 so that they will forcibly contact each other when the shells are drawn toward each other. The seating ring 50 is held upon an angular ring 51 by means of a clamping ring 52. The angular ring 51 has a cylindrical portion which fits over the outer surface of the shells 32 and 33. In this manner, the seating rings 50 are positioned so that they will align with each other during movement of the shells 32 and 33 together.

It should be noted that the seating rings 50 are flared outwardly. This makes it possible for them to be tightly compressed against each other when they are brought together, as this outward flaring permits them to more freely yield into place. Also, this flaring of the seating rings makes it possible for them to yield outwardly to permit the escape of any carbon dioxide gas which may be trapped inside or which may escape from the hollow members 10 and 11 when they are brought together or after they are in sealing contact. This outward flaring of seating rings 50 permits such escape of gas from the inside while more effectively preventing the entry of atmospheric moisture.

To unite the coupling, its two halves are brought together in alignment, making certain that the reduced portion 17 of hollow member 11 enters the retaining sleeve 14 of hollow member 10. This guides the seating surface 13 into the proper position on gasket 12. Notches 46 of arms 42 are then brought upon pins 47 and the arms are swung to draw the parts together. The parts remain locked together due to the over-center-movement of links 40 past pins 47.

This movement of hollow members 10 and 11 towards each other, causes the valve extensions 25 to contact and unseat the valves 20 in both sections of the couplings. A through-flow for fluid is, therefore, established through the coupling. The seating rings 50 are brought together, at the same time to establish a seal at the outer peripheries of the insulation and this seal will prevent the entrance of atmospheric moisture. Moisture will not freeze out on the exposed ends of the hollow members, such as might resist their subsequent separation.

To disconnect the coupling, it is merely necessary to swing the lever arms 42 to the left and remove the notches 46 from the pins 47. The two sections may then be completely separated. As the sections are separated, the valve extensions 25 are withdrawn from each other, and the valves in both sections seat. Fluid cannot then escape from either section.

What we claim is:

1. A coupling for fluid conduits to carry a cooled medium, comprising a pair of hollow members, heat insulation means on the outside of said members, seating surfaces including a gasket at the meeting ends of said members to cooperate to establish a tight seal when the members are together, sealing means spaced outwardly from said seating surfaces to cooperate to establish a seal between the contiguous ends of said insulating means to exclude atmospheric moisture from the region of said seating surfaces, and releasable means for retaining the member together.

2. A coupling for fluid conduits to carry a cooled medium, comprising a pair of hollow members, heat insulation means on the outside of said members, seating surfaces including a gasket at the meeting ends of said members to cooperate to establish a tight seal when the members are together, sealing means of resilient material spaced outwardly from said seating surfaces to cooperate to establish a seal between the contiguous ends of said insulating means to exclude atmospheric moisture from the region of said seating surfaces, said resilient sealing means flaring outwardly so as to yield to permit the escape of any fluid leaking past the seating surfaces, and releasable means for forcing the hollow members together.

3. A coupling for fluid conduits to carry a cooled medium, comprising a pair of hollow members having seating surfaces at their meeting ends to cooperate to establish a tight seal when the members are together, insulation upon the outer sides of said members, a shell surrounding the insulation on each member, sealing means carried by the shells at their contiguous ends to cooperate to establish a seal and exclude atmospheric moisture from the region of said seating surfaces, and releasable means for retaining the members together.

4. A coupling for fluid conduits to carry a cooled medium, comprising a pair of hollow members having seating surfaces at their meeting ends to cooperate to establish a tight seal when the members are together, insulation upon the outer sides of said members, a shell surrounding the insulation on each member, and a ring of resilient material carried by each shell at their contiguous ends to forcibly bear upon each other and establish a seal excluding atmospheric moisture from the region of said seating surfaces, and releasable means for retaining the members together.

5. A coupling for fluid conduits to carry a cooled medium, comprising a pair of hollow members having seating surfaces at their meeting ends to cooperate to establish a tight seal when the members are together, insulation upon the outer sides of said members, a shell surrounding the insulation on each member, a ring of resilient material carried by each shell at their contiguous ends to forcibly bear upon each other and establish a seal excluding atmospheric moisture from the region of said seating surfaces, said rings flaring outwardly to yield to permit the escape between them of any gas leaking past said seating surfaces, and releasable means for retaining the members together.

6. A coupling for fluid conduits to carry a cooled medium, comprising a pair of hollow members having seating surfaces at their meeting ends to cooperate to establish a tight seal when the members are together, insulation upon the outer sides of said members, a shell surrounding the insulation on each member, each hollow member and its shell having opposing flanges associated therewith, resilient material between said flanges, and releasable means connected to said shells for drawing them toward each other, the force applied by said releasable means acting through said resilient material to urge the members into sealing contact.

7. A coupling for fluid conduits to carry a cooled medium, comprising a pair of hollow members having seating surfaces at their meeting ends to cooperate to establish a tight seal when the members are together, insulation upon the outer sides of said members, a shell surrounding the insulation on each member, sealing means carried by the shells at their contiguous ends to cooperate to establish a seal and exclude atmospheric moisture from the region of said surfaces, each hollow member and its shell having opposing flanges associated therewith, resilient material between said flanges, and releasable means connected to said shells for drawing them toward each other, the force applied by said releasable means acting through said resilient material to urge the members into sealing contact.

8. A coupling for fluid conduits to carry a cooled medium, comprising a pair of hollow members having seating surfaces at their meeting ends to cooperate to establish a tight seal when the members are together, insulation upon the outer sides of said members, a shell surrounding the insulation on each member, each hollow member and its shell having opposing flanges associated therewith, resilient material between said flanges, and a latch having portions pivotally connected to said shells at diametrically opposite points to draw the shells toward each other, said latch being disconnectable to permit complete separation of the shells and their hollow members, the force applied by said latch acting through said resilient material to urge the members into sealing contact.

9. A coupling for fluid conduits to carry a cooled medium comprising a pair of hollow members having means at their outer ends for attachment to conduit portions and having seating surfaces at their inner ends to cooperate to establish a tight seal when the members are forced together, a quick detachable latch mechanism for forcing the hollow members together, and means for connecting the latch mechanism to the hollow members including resilient means between said mechanism and each member.

10. A coupling for fluid conduits to carry a cooled medium comprising a pair of hollow members having means at their outer ends for attachment to conduit portions and having seating surfaces at their inner ends to cooperate to establish a tight seal when the members are forced together, a latch mechanism for forcing the hollow members together, and means for connecting the latch mechanism to the hollow members including a flanged shell mounted on and substantially inclosing each hollow member, an abutment element associated with each hollow member within its shell, and resilient means interposed between the flange of each shell and the related abutment element through which the force of the latch mechanism is applied to the hollow members.

11. A coupling for fluid conduits to carry a cooled medium comprising a pair of hollow members having means at their outer ends for attachment to conduit portions and having seating surfaces at their inner ends to cooperate to establish a tight seal when the members are forced together, a latch mechanism for forcing the hollow members together, and means for connecting the latch mechanism to the hollow members including a flanged shell mounted on and substantially enclosing each hollow member, said shells having engageable, compressible sealing rings at their adjacent ends, an abutment element associated with each hollow member within its shell, and resilient means interposed between the flange of each shell and the related abutment element through which the force of the latch mechanism is applied to the hollow members and to the compressible sealing rings.

HILDING V. WILLIAMSON.
RAYMOND HARRY GRIESEMER.

REFERENCES CITED

The following references are of record in the file of this patent:

UNITED STATES PATENTS

| Number | Name | Date |
| --- | --- | --- |
| 293,453 | Hamer | Feb. 12, 1883 |
| 570,170 | Greenfield | Oct. 27, 1896 |
| 2,322,449 | Johnson et al. | June 22, 1943 |

FOREIGN PATENTS

| Number | Country | Date |
| --- | --- | --- |
| 396 | Great Britain | Feb. 3, 1875 |
| 16,849 | Denmark | Jan. 1913 |
| 26,502 | Netherlands | 1932 |
| 157,041 | Germany | May 15, 1939 |
| 313,788 | Germany | 1919 |